United States Patent
Nishizawa et al.

(10) Patent No.: US 11,001,311 B2
(45) Date of Patent: May 11, 2021

(54) STEERING MEMBER

(71) Applicants: FUTABA INDUSTRIAL CO., LTD., Okazaki (JP); TOYOTA JIDOSHA KABUSHIKI KAISHA, Toyota (JP)

(72) Inventors: Norito Nishizawa, Okazaki (JP); Kazuaki Kurita, Toyota (JP)

(73) Assignees: FUTABA INDUSTRIAL CO., LTD., Aichi (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 15 days.

(21) Appl. No.: 16/250,518

(22) Filed: Jan. 17, 2019

(65) Prior Publication Data
US 2019/0225280 A1    Jul. 25, 2019

(30) Foreign Application Priority Data
Jan. 25, 2018    (JP) .............................. JP2018-010584

(51) Int. Cl.
*B62D 25/14*    (2006.01)
*B62D 1/16*    (2006.01)

(52) U.S. Cl.
CPC ............. *B62D 25/145* (2013.01); *B62D 1/16* (2013.01)

(58) Field of Classification Search
CPC ......... B62D 1/16; B62D 25/14; B62D 25/145
USPC ..................... 296/72, 193.02, 205
See application file for complete search history.

(56) References Cited

U.S. PATENT DOCUMENTS

| | | | | |
|---|---|---|---|---|
| 8,029,045 B2 * | 10/2011 | Merkle | ................ | B62D 25/145 296/193.02 |
| 8,393,671 B2 * | 3/2013 | Watanabe | ............ | B62D 25/147 296/193.02 |
| 8,622,464 B2 * | 1/2014 | Atsumi | ................ | B62D 25/145 296/193.02 |
| 8,925,994 B2 * | 1/2015 | Arzoumanian | ...... | B62D 29/008 180/90 |

(Continued)

FOREIGN PATENT DOCUMENTS

| JP | 08005896 Y | 2/1996 |
|---|---|---|
| JP | H11129940 A | 5/1999 |
| JP | 2002274433 A | 9/2002 |

(Continued)

OTHER PUBLICATIONS

English translation of JP 2012-228924; retreived Apr. 9, 2020 via PatentTranslate located at www.epo.org. (Year: 2020).*

(Continued)

*Primary Examiner* — Jason S Daniels
(74) *Attorney, Agent, or Firm* — David D. Brush; Westman, Champlin & Koehler, P.A.

(57) ABSTRACT

A steering member includes a main body extending in a vehicle-width direction, at least one support part, a reinforcing part, and a bracket. The support part supports the steering. The reinforcing part is formed in a plate-like shape and attached to a reinforced area of an outer circumferential surface of the main body. The bracket is attached to the reinforcing part and extends from the reinforcing part toward a front side of the vehicle so as to be attached to a body of the vehicle. The outer circumferential surface of the main body comprises a support area to which the at least one support part is attached. The reinforced area faces the support area across the main body.

17 Claims, 4 Drawing Sheets

(56) References Cited

U.S. PATENT DOCUMENTS 10,358,166 B2* 7/2019 Shirooka .............. B62D 21/152
2018/0099699 A1* 4/2018 Kurita ...................... B62D 1/16

FOREIGN PATENT DOCUMENTS

JP    2012228924 A    11/2012
JP    2016013741 A    1/2016

OTHER PUBLICATIONS

English translation of JP 2002-274433; retreived via Patenttranslate located at www.epo.org. (Year: 2020).*
English translation of the Japanese Notice of Reasons for Rejection dated Dec. 20, 2019 for corresponding Japanese Application No. 2018/010584.
English translation of the Japanese Notice of Reasons for Refusal dated Mar. 17, 2020 for corresponding Japanese Application No. 2018-010584.
English translation of Chinese Office Action dated Dec. 22, 2020 for corresponding Chinese Application No. 201910061925.X.

* cited by examiner

STEERING MEMBER

CROSS-REFERENCE TO RELATED APPLICATIONS

The present application claims the benefit of Japanese Patent Application No. 2018-10584 filed on Jan. 25, 2018 with the Japan Patent Office, the entire of which is incorporated herein by reference.

BACKGROUND

The present disclosure relates to a steering member disposed under a dashboard of a vehicle.

The steering member of the vehicle is provided with a bracket that supports a steering column. A bracket of a steering member described in Unexamined Japanese Utility Application Publication No. H8-5896 projects toward the rear side of a vehicle, and has a lower member and an upper member. An attachment portion located in the front side of the lower member and an attachment portion located in the front side of the upper member are welded on the lateral surface of the steering member.

SUMMARY

To improve the stiffness of the steering member, increasing plate thickness of, for example, the attachment portion of the lower member, and the attachment portion of the upper member can be considered. However, the lower member and the upper member are produced by pressing steel plates. As the thickness of the attachment portions increases, the thickness of the entire lower member and the upper member increases. Thus, the weight of the steering member increases.

In consideration of these points, in an exemplary embodiment, the stiffness of a steering member is improved while an increase in weight is inhibited.

One aspect of the present disclosure provides a steering member installed in a vehicle to support a steering. The steering member comprises a main body, at least one support part, a reinforcing part, and a bracket. The main body is formed in a rod-like shape, and extends in a vehicle-width direction of the vehicle such that both ends of the main body are attached to a body of the vehicle. The at least one support part is attached to an outer circumferential surface of the main body and attached to the steering so as to support the steering The reinforcing part is formed in a plate-like shape, and covers and is attached to a reinforced area in the outer circumferential surface of the main body. The bracket is attached to the reinforcing part and extends from the reinforcing part toward a front side of the vehicle so as to be attached to the body of the vehicle. The outer circumferential surface of the main body comprises a support area to which the at least one support part is attached. The reinforced area faces the support area across the main body.

The reinforced area in the outer circumferential surface of the steering member faces the support area to which the support part, supporting the steering located under the steering member, is attached across the steering member. Accordingly, when a force in the up-down direction is applied to the steering member through the steering, stress is produced in the reinforced area.

On the other hand, according to the above-described structure, the reinforced area is covered by the plate-like reinforcing part and thus the plate thickness of the reinforced area is partly increased. Accordingly, while an increase in weight of the steering member is inhibited, the stiffness of the steering member against the force applied in the up-down direction through the steering can be increased.

Moreover, the bracket, extending toward the front side of the vehicle, is attached to the reinforcing part. Accordingly, a force transmitted from the bracket to the steering member, when a collision and the like of the vehicle take place, can be distributed, and deformation of the steering member can be inhibited.

Thus, the stiffness of the steering member can be improved while an increase in weight is inhibited.

In one aspect of the present disclosure, the reinforced area faces the support area across a center line that is a straight line extending in the vehicle-width direction. The center line passes a center or substantially a center of a cross-section of a portion of the main body located where the reinforced area is provided, and the cross-section is perpendicular to the vehicle-width direction.

With such a structure, the stiffness of the steering member can be also improved while an increase in weight is inhibited.

In one aspect of the present disclosure, the bracket may comprise a bracket attachment portion attached to the reinforcing part. The bracket attachment portion may be attached to the reinforcing part so as to be disposed inside of an edge of the reinforcing part.

Due to such a structure, the force transmitted from the bracket to the steering member when a collision and the like of the vehicle take place can be more reliably distributed.

In one aspect of the present disclosure, the reinforcing part may comprise a covering area covering the reinforced area. The covering area may comprise an attaching area extending along an edge of the covering area, and a hollow area surrounded by the attaching area. The reinforcing part may be attached to the reinforced area in a manner such that the attaching area is in contact with the reinforced area and a space is formed between the hollow area and the reinforced area.

Due to such as structure, the stiffness of the steering member against the force in the up-down direction applied through the steering can be further improved.

In one aspect of the present disclosure, one side of the vehicle-width direction is defined as a right side, and the other side of the vehicle-width direction is defined as a left side. The support part may comprise a steering attachment portion attached to the steering. A rightmost portion of the steering attachment portion is defined as a right end, and a leftmost portion of the steering attachment portion is defined as a left end. The reinforced area may extend at least from the right end to the left end in the vehicle-width direction.

Due to such a structure, the stiffness of the steering member can be further improved.

In one aspect of the present disclosure, the bracket may comprise a weak portion having a stiffness lower than a stiffness in any other portion of the bracket.

Due to such a structure, in a case where a collision and the like of the vehicle take place and thereby the bracket is bent at the weak portion, the steering member and the steering can be inhibited from projecting into the interior of the vehicle. Since one end of the bracket is attached to the reinforcing part and thus the stiffness of the root portion of the bracket is reinforced, the bracket can be more reliably bent at the weak portion when a collision and the like of the vehicle take place.

In one aspect of the present disclosure, a line, passing a center or substantially a center of a cross-section of the main body perpendicular to the vehicle-width direction and extending in the vehicle-width direction, may be defined as a center line. A direction of a circumference of a circle around the center line of the cross-section may be defined as an outer circumferential direction. A range extending from a first position to a second position in the outer circumferential direction may be defined as a reinforcement range. The second position may be located at a position displaced by 90° from the first position in the outer circumferential direction. A range extending from a third position to a fourth position in the outer circumferential direction may be defined as a support range. The fourth position may be located at a position displaced by 90° from the third position in the outer circumferential direction. The third position may be located on a straight line connecting the first position and the center line. The fourth position may be located on a straight line connecting the second position and the center line. The reinforced area may extend at least over the reinforcement range in the outer circumferential direction. The support area may extend at least over the support range in the outer circumferential direction.

In other words, the reinforcement range and the support range are ranges extending 90° around the center line in the outer circumferential direction. These ranges have, on the cross-section of the main body, a relation of point symmetry around the center line. The reinforced area covered by the reinforcing part extends at least over the reinforcement range, and the support area on which the support part is disposed extends at least over the support range. Accordingly, the stiffness of the steering member against the force in the up-down direction applied through the steering can be further improved.

In one aspect of the present disclosure, the reinforcing part may be attached to the reinforced area so as to extend in the vehicle-width direction.

Due to such a structure, in an exemplary embodiment, the stiffness of the steering member can be improved.

In one aspect of the present disclosure, the support area may be an elongated area extending in a direction intersecting with the vehicle-width direction at a right angle or approximately at a right angle.

Due to such a structure, in an exemplary embodiment, the stiffness of the steering member can be improved.

In one aspect of the present disclosure, a cross-section of the main body perpendicular to the vehicle-width direction may be a circle or substantially a circle.

Due to such a structure, in an exemplary embodiment, the stiffness of the steering member can be improved.

BRIEF DESCRIPTION OF THE DRAWINGS

An example embodiment of the present disclosure will be described hereinafter by way of example with reference to the accompanying drawings, in which.

DETAILED DESCRIPTION OF EXEMPLARY EMBODIMENTS

Embodiments of the present disclosure are not limited to those to be described below, and may adopt various forms within the technical scope of the present disclosure.

[Entire Structure]

Figure 1:
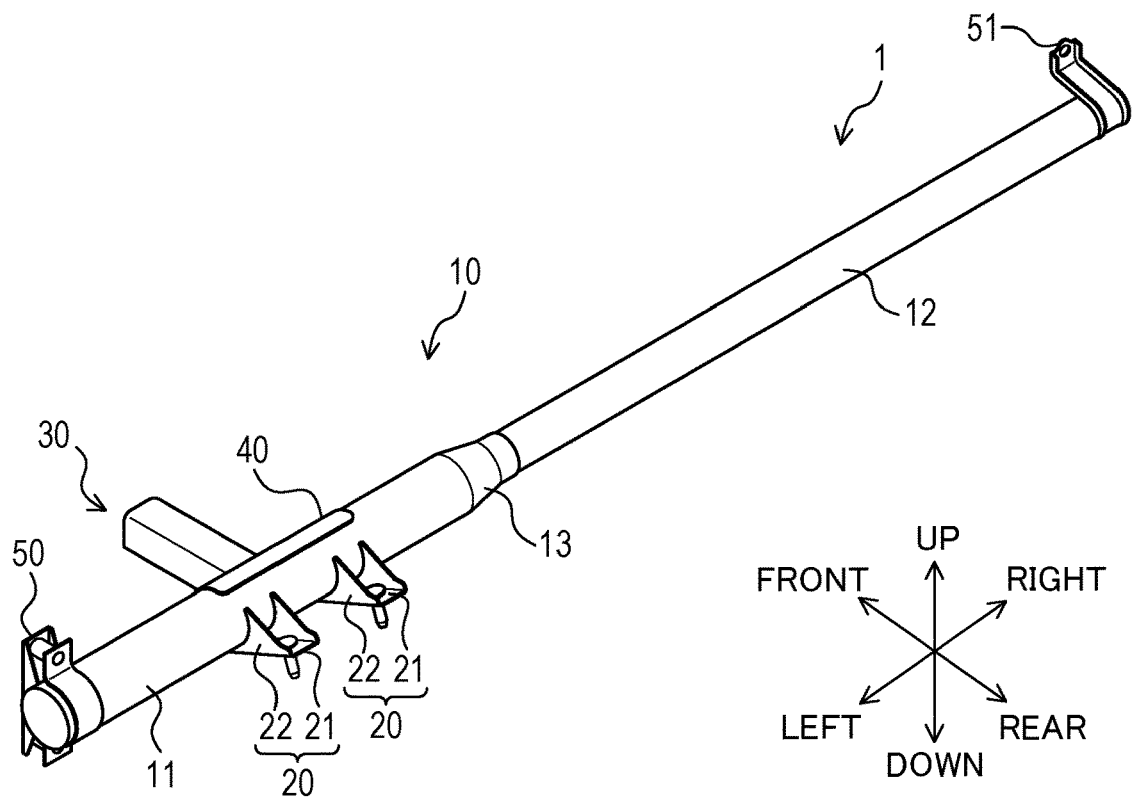
FIG. 1 is a perspective view showing a steering member.

A steering member 1 shown in FIG. 1 according to the present embodiment is installed in a vehicle so as to extend in a vehicle-width direction. The steering member 1 is located under a dashboard of the vehicle. Hereinafter, the front side, the rear side, the upper side, and the lower side of the vehicle will be simply referred to as the front side, the rear side, the upper side, and the lower side. Moreover, the right side and the left side relative to the front side of the vehicle will be simply referred to as the right side and the left side.

Figure 2:
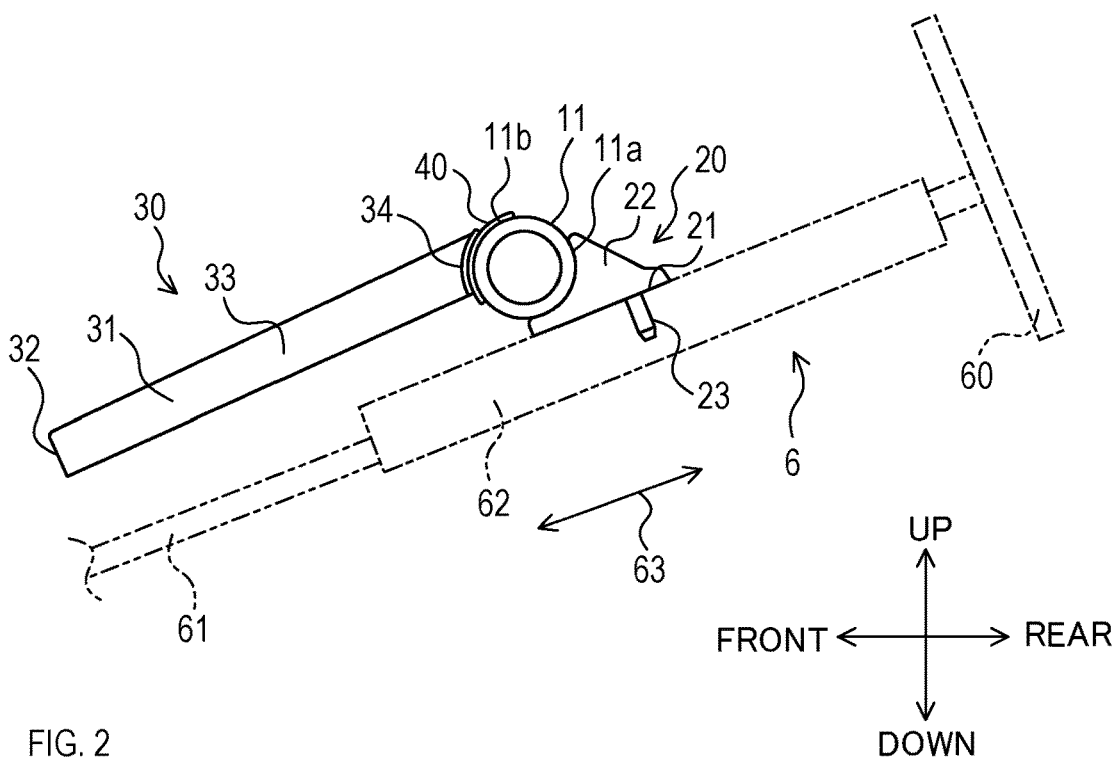
FIG. 2 is a side view showing the steering member.

As shown in FIG. 2, a steering member 1 supports, from the upper side, a steering column 62 disposed under the steering member 1. The steering column 62 partly forms a steering 6 of the vehicle. The steering column 62 externally surrounds a steering shaft 61 and extends in an axial direction 63 of the steering shaft 61. The steering shaft 61 transmits a rotational operation force for a steering wheel 60 to a steering mechanism.

As shown in FIGS. 1 to 6, the steering member 1 comprises a main body 10, two support parts 20, a bracket 30, a reinforcing part 40, a first attachment 50, and a second attachment 51. In addition to these components, the steering member 1 may comprise, for example, a bracket attached to a vehicle body or a device installed in the vehicle (such as an instrument panel, an airbag, and so on), and an attachment for attaching such a device installed in the vehicle.

The main body 10 is a tubular member linearly extending in the right-left direction (in other words, in the vehicle-width direction). Both ends of the main body 10 are attached to the body of the vehicle. Specifically, the left end of the main body 10 is attached to the vehicle body by the first attachment 50, and the right end is attached to the vehicle body by the second attachment 51. Each end may be attached to, for example, a pillar of the vehicle.

The main body 10 comprises a first portion 11, a second portion 12, and a tapered portion 13.

The first portion 11 is a portion of the main body 10 located in front of the driver's seat (in other words, the left portion). The second portion 12 is a portion of the main body 10 located in front of the front passenger seat (in other words, the right portion), and is smaller in diameter than the first portion 11. The cross-sections of the first portion 11 and the second portion 12 perpendicular to the right-left direction (hereinafter to be simply referred to cross-sections) are circular or substantially circular. However, the shapes of the cross-sections may be, for example, oval or polygonal.

The tapered portion 13 is tapered and connects the first portion 11 and the second portion 12.

The support parts 20 are attached to the outer circumferential surface (in other words, the lateral surface) of the first portion 11 of the main body 10, and support the steering column 62. The first portion 11 is provided with, for example, two support parts 20 aligned in the right-left direction. However, the number of the support part 20 may be one, three, or more. The support parts 20 are attached to the steering column 62 so as to support the steering column 62 from the upper side.

Each of the support parts 20 comprises a bottom surface 21, two connecting portions 22, and a bolt 23.

The bottom surface 21 is formed in a rectangular-plate shape. The bottom surface 21 is disposed such that its long-side portions extend in the axial direction 63 of the steering 6. The long-side portions mean portions of the edge of the bottom surface 21 that form the long sides. The bottom surface 21 is disposed covering the outer circumferential surface of the steering column 62. The bottom surface 21 is provided with a hole and is attached to the outer circumferential surface of the steering column 62 by the bolt 23 inserted into the hole.

Each connecting portion 22 is provided to the corresponding long-side portion of the bottom surface 21. The connecting portions 22 project upward from the long-side portions of the bottom surface 21, and are formed in wall-like shapes extending in planar manners.

Figure 3:
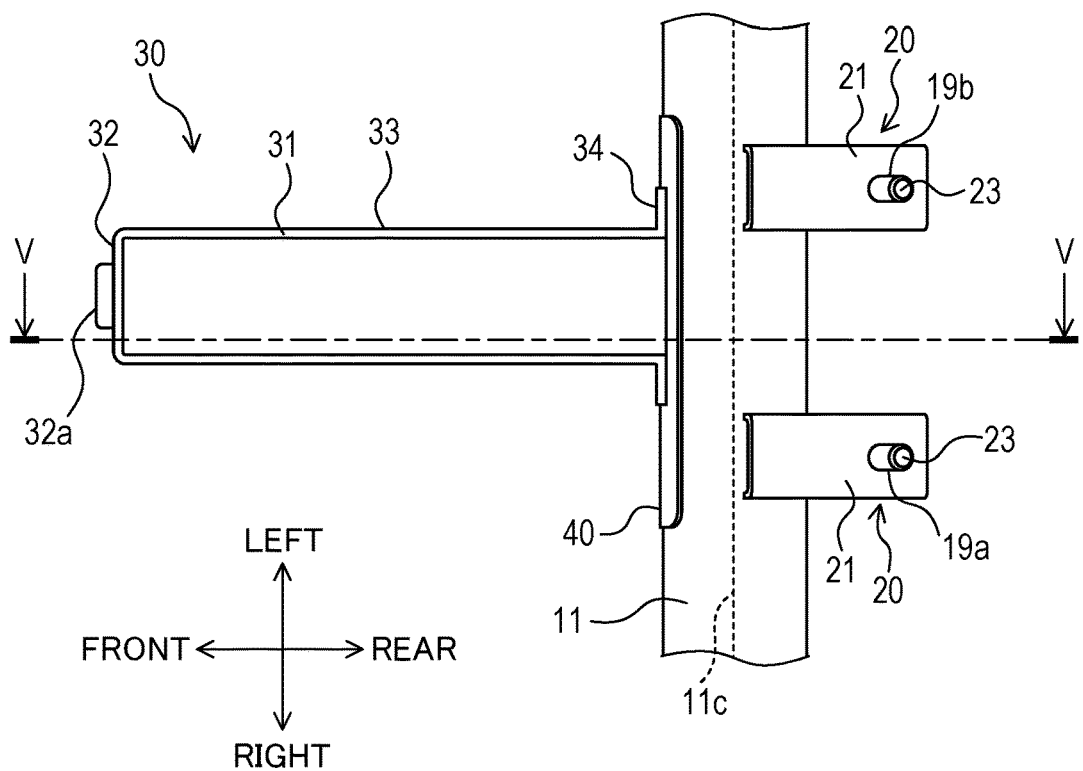
FIG. 3 is a bottom view showing a bracket and a support part of the steering member.
Figure 4:
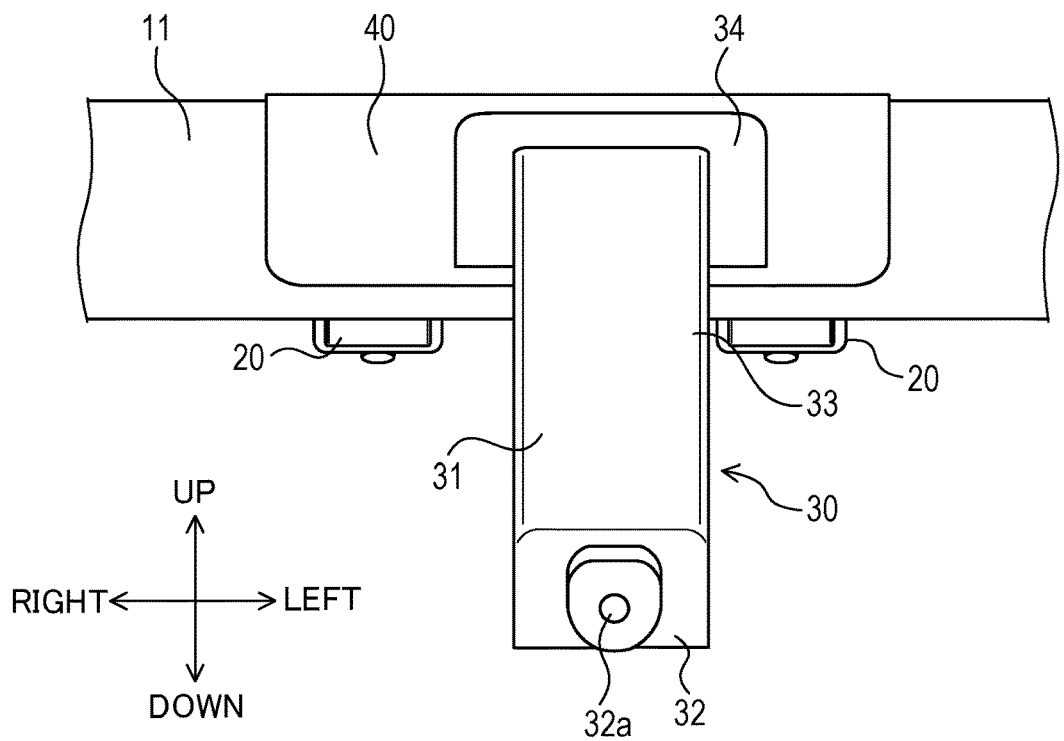
FIG. 4 is a front view showing the bracket of the steering member.
Figure 5:
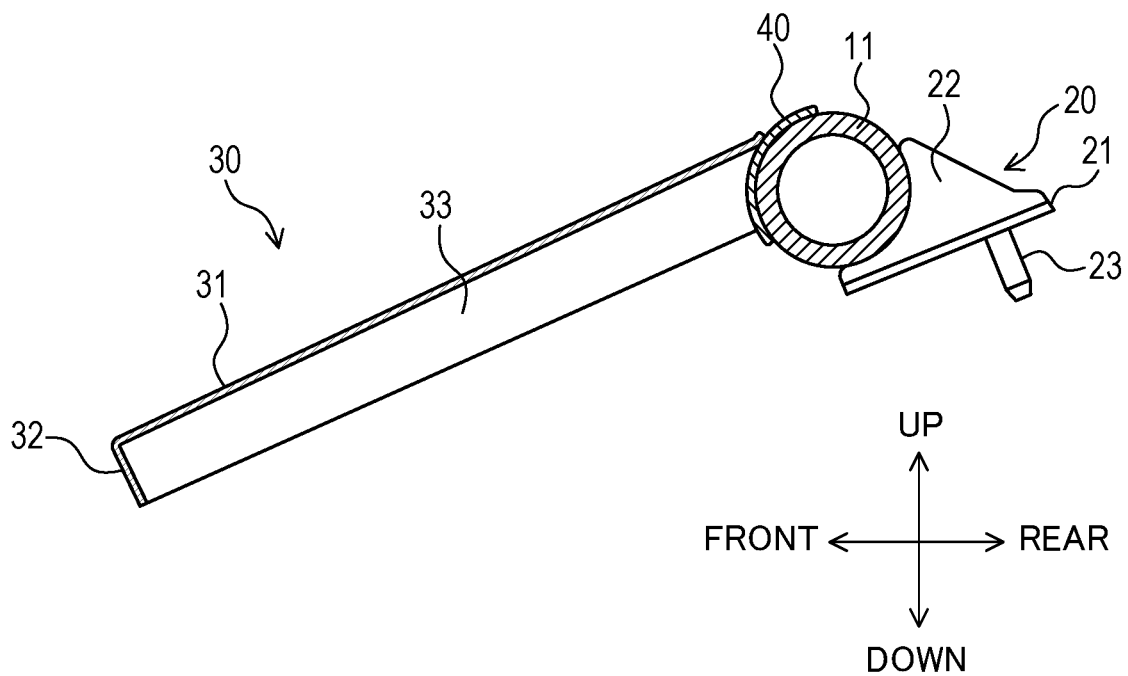
FIG. 5 is a sectional view cut along a line V-V in FIG. 3.
Figure 6:
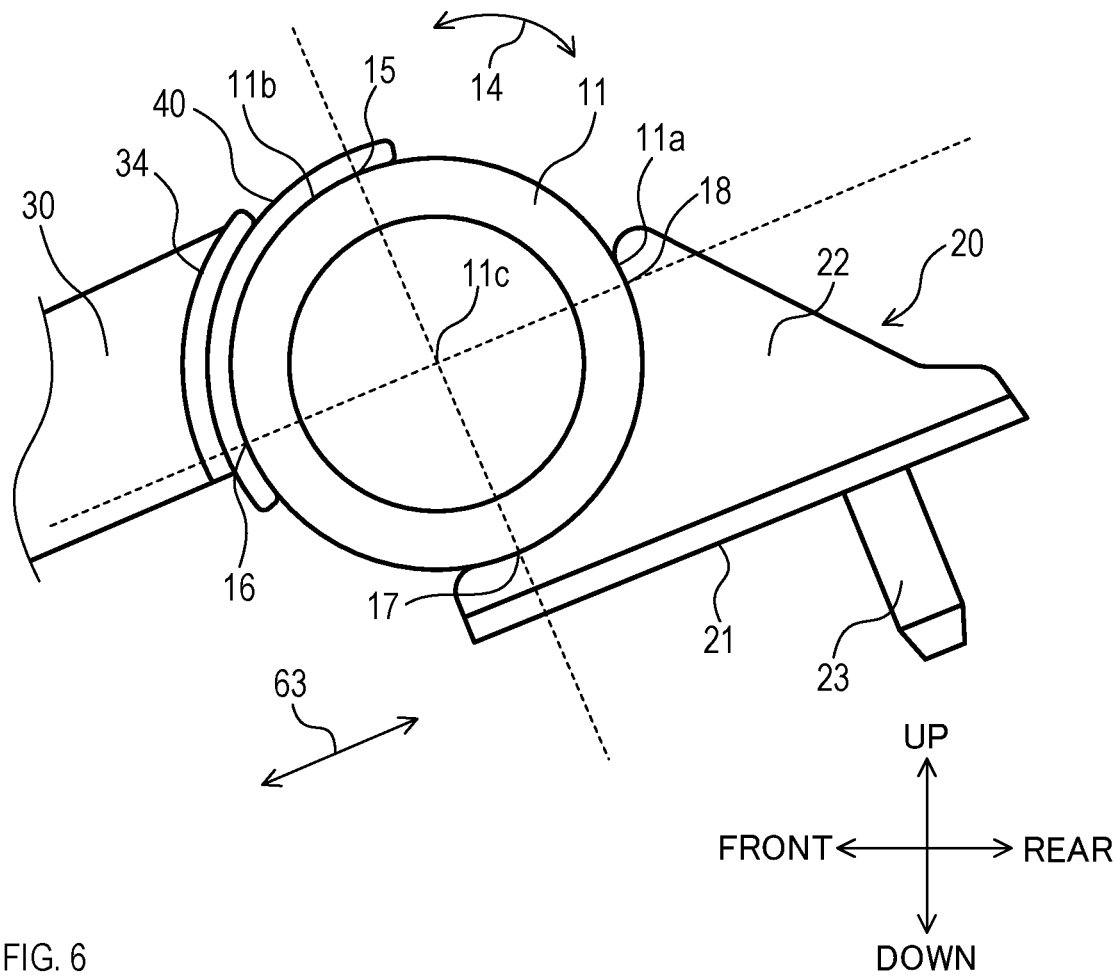
FIG. 6 is an enlarged view showing a portion of the bracket and a portion of a support part attached to a first portion in a main body of the steering member.

A portion of the edge of each connecting portion 22 is attached (for example, welded) to the outer circumferential surface of the first portion 11 of the main body 10. The area where each connecting portion 22 is attached is an elongated area extending along an outer circumferential direction 14. The outer circumferential direction 14 is, as shown in FIG. 6, the direction along the circumference of a circle, which is the shape of a cross-section of the first portion 11, around a center line 11c of the first portion 11 of the main body 10. The center line 11c is, as shown in FIG. 3, a virtual straight line that extends in the right-left direction and passes the center or substantially the center of the cross-section of the first portion 11. Hereinafter, the areas of the outer circumferential surface of the first portion 11 where the support parts 20 are attached (hereinafter, attached areas) will be referred altogether to as a support area 11a. The support area 11a (in other words, attached areas) is an elongated area extending perpendicularly or substantially perpendicularly to the right-left direction.

In one example, the upper ends of the attached areas where the connecting portions 22 of the support parts 20 and the first portion 11 are attached are linearly aligned in the right-left direction. The lower ends of the attached areas are also linearly aligned in the right-left direction. However, the upper ends and the lower ends of the attached areas do not have to be respectively linearly aligned in the right-left direction. The attached areas may be formed in, for example, elongated areas extending in the right-left direction, dot-like areas, circular areas, or polygonal areas.

The reinforcing part 40 is a rectangular plate member that covers a rectangular reinforced area 11b in the outer circumferential surface of the first portion 11, and is attached to the reinforced area 11b. The longitudinal direction of the reinforcing part 40 aligns with in the right-left direction. In one example, the reinforcing part 40 may be welded to the reinforced area 11b. More specifically, the reinforcing part 40 may be attached to the reinforced area 11b by, for example, laser welding along the edge. The reinforcing part 40 may be attached to the reinforced area 11b by other welding methods apart from laser welding. Moreover, the reinforcing part 40 is not limited to a rectangular shape, and may be, for example, a circular or an oval plate member. The details of the position of the reinforced area 11b will be described below.

The bracket 30 is a separate part from the support parts 20. The bracket 30 is attached to the reinforcing part 40 at one end and extends forward from the reinforcing part 40. The front end of the bracket 30 is attached to the body of the vehicle. The bracket 30, for example, does not have to be attached to the body of the vehicle.

The bracket 30 is formed in a plate shape having a groove extending in the front-rear direction. The opening of the groove is directed downward. The bracket 30 comprises a groove portion 31, a front end portion 32, a weak portion 33, and a bracket attachment portion 34.

The groove portion 31 is formed in an elongated plate shape and extends in the front-rear direction. The groove portion 31 comprises the bottom portion and two side portions facing each other in the right-left direction. A groove of the bracket 30 is formed by the bottom portion and the two side portions.

The front end portion 32 is provided at the front end of the bracket 30, and formed in a wall-like shape. The front end portion 32 is provided with a hole portion 32a. The bracket 30 is attached to the body of the vehicle by a bolt inserted into the hole portion 32a.

The bracket attachment portion 34 is provided at the rear end of the groove portion 31 so as to attach the bracket 30 to the reinforcing part 40. The bracket attachment portion 34 has, for example, a flange-like shape and outwardly extends from the rear end of the groove portion 31. The bracket attachment portion 34 may, for example, inwardly extend from the rear end of the groove portion 31.

The bracket attachment portion 34 is attached to the reinforcing part 40 (for example, by welding). More specifically, the bracket attachment portion 34 is attached to the reinforcing part 40 at a position inside the edge of the reinforcing part 40. That is, the bracket attachment portion 34 is attached such that the edge of the bracket attachment portion 34 does not extend out of the edge of the reinforcing part 40. In other words, the bracket attachment portion 34 is attached to the reinforcing part 40 so as to face only the reinforced area 11b, but not any other areas of the outer circumferential surface of the first portion 11.

Approximately the center of the bracket 30 in the front-rear direction is configured as the weak portion 33. The weak portion 33 has a low stiffness as compared to other portions of the bracket 30. Accordingly, when a collision and the like of the vehicle take place, the bracket 30 is bent at the weak portion 33. The stiffness of the weak portion 33 may be decreased by, for example, making the plate thickness of the weak portion 33 smaller than those of other portions. Alternatively, the stiffness of the weak portion 33 may be decreased by providing a notch to the weak portion 33.

[Reinforced Area]

The following describes the details of the position of the reinforced area 11b. As shown in FIG. 6 and so on, the reinforced area 11b is provided in a position of the first portion 11 opposite to the support area 11a across the center line 11c. More specifically, the reinforced area 11b extends, as shown in FIG. 6, at least over a reinforcement range in the outer circumferential direction 14, and, as shown in FIG. 3, extends from a right end 19a to a left end 19b of a steering attachment portion (to be described below) in the right-left direction.

First, the reinforcement range will be described in detail. The reinforcement range means a range extending from a first position 15 to a second position 16 in the outer circumferential direction 14, and the second position 16 is a position displaced by 90° from the first position 15 in the outer circumferential direction 14. In other words, the reinforcement range extends 90° from the first position 15 to the second position 16 in the outer circumferential direction 14.

On the other hand, the support range means a range extending from a third position 17 to a fourth position 18 in the outer circumferential direction 14, and the fourth position 18 is a position displaced by 90° from the third position 17 in the outer circumferential direction 14. In other words, the support range extends 90° from the third position 17 to the fourth position 18 in the outer circumferential direction 14.

The third position 17 of the support range is located on a straight line connecting the first position 15 of the reinforcement range and the center line 11c. The fourth position 18 of the support range is located on a straight line connecting the second position 16 of the reinforcement range and the center line 11c.

In other words, the reinforcement range and the support range are both areas in the cross-section of the first portion 11 around the center line 11c extending 90° in the outer circumferential direction. These ranges possess a relation of point symmetry in the cross-section around the center line 11c. Thus, if the reinforcement range is rotated 180° around the center line 11c, the reinforcement range overlaps the support range.

The straight line connecting the first position 15 and the third position 17 intersects with the axial direction 63 of the steering 6 at a right angle or substantially at a right angle. On the other hand, the straight line connecting the second position 16 and the fourth position 18 is parallel or substantially parallel to the axial direction 63 of the steering 6.

The reinforced area 11b extends in the outer circumferential direction 14 at least over the reinforcement range. The support area 11a extends in the outer circumferential direction 14 at least over the support range.

The first to the fourth positions 15 to 18 may be located such that the straight line connecting the first position 15 and the third position 17 does not intersect with the axial direction 63 of the steering 6 at a right angle or substantially at a right angle. The reinforced area 11b may be located, for example, such that the reinforced area 11b faces the support area 11a across the center line 11c of the first portion 11 and does not cover at least one portion of the reinforcement range. The support area 11a may be located, for example, such that the support area 11a faces the reinforced area 11b across the center line 11c of the first portion 11 and does not cover at least one portion of the support range.

Next, the range of the reinforced area 11b in the right-left direction will be described with reference to FIG. 3.

A portion of the support part 20 attached to the steering column 62 is referred to as a steering attachment portion. In the present embodiment, a portion of the bottom surface 21 of the support part 20 where the bolt 23 is disposed corresponds to the steering attachment portion.

The rightmost portion of the steering attachment portion is referred to as the right end 19a. The leftmost portion of the steering attachment portion is referred to as the left end 19b. In the present embodiment, the rightmost portion of the bolt 23 of the right support part 20 corresponds to the right end 19a. The leftmost portion of the bolt 23 of the left support part 20 corresponds to the left end 19b. The reinforced area 11b extends in the right-left direction at least from the right end 19a to the left end 19b. The reinforced area 11b may be located, for example, in the left side of the right end 19a, or may be located in the right side of the left end 19b.

MODIFIED EXAMPLES

The reinforcing part 40 may be formed as, for example, a thin plate, a thick plate, a curved plate, or a plate having an uneven plate thickness. More specifically, the curved plate may be, for example, curved in a wave-like form at multiple points. The plate having an uneven plate thickness may be formed, for example, such that the center portion is thicker than other portions and the thickness gradually changes.

Figure 7:
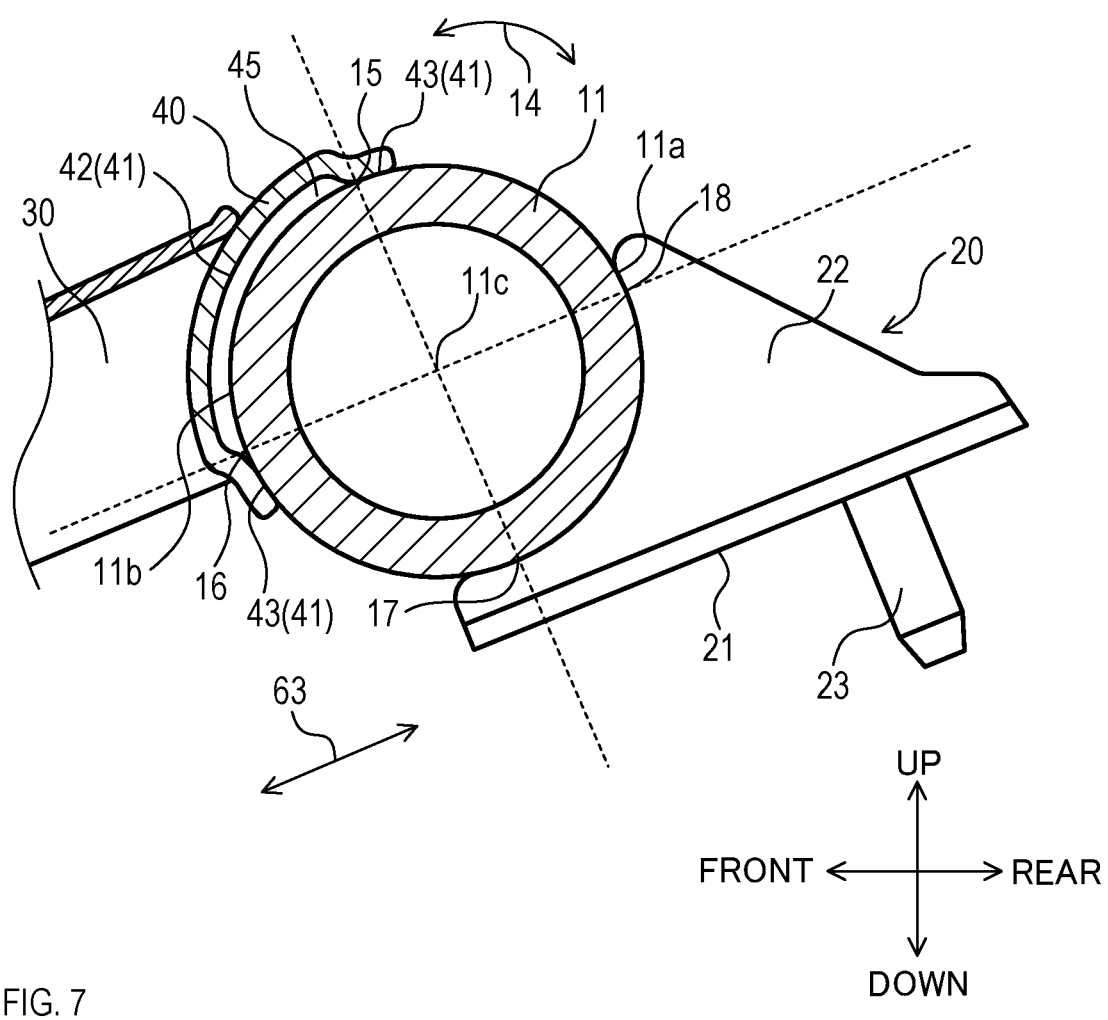
FIG. 7 is an enlarged sectional view of the first portion in the main body of the steering member showing a portion where the bracket is attached and a portion where the support part is attached according to a modified example.

As shown in FIG. 7, the reinforcing part 40 may form a flat space 45 extending between the reinforcing part 40 and the reinforced area 11b along the reinforcing part 40, and may be attached to the main body 11.

Specifically, in the reinforcing part 40, the area that covers the reinforced area 11b when the reinforcing part 40 is attached to the reinforced area 11b is referred to as a covering area 41. In other words, the covering area 41 faces the reinforced area 11b. The covering area 41 includes a hollow area 42 and an attaching area 43.

The attaching area 43 is adjacent to the edge of the covering area 41, and extends along the edge of the covering area 41. More specifically, the edge of the covering area 41 is entirely adjacent to the attaching area 43. The hollow area 42 is located in the center of the covering area 41 and surrounded by the attaching area 43. The attaching area 43 may be provided in a position away from the edge of the covering area 41.

The reinforcing part 40 is attached to the reinforced area 11b while the attaching area 43 is in contact with the reinforced area 11b and the space 45 is formed between the hollow area 44 and the reinforced area 11b. More specifically, the attaching area 43 of the reinforcing part 40 is attached to the reinforced area 11b (for example, by welding).

[Effect]

(1) The reinforced area 11b in the outer circumferential surface in the first portion 11 of the steering member 1 faces the support area 11a to which the support parts 20 are attached across the center line 11c of the first portion 11. Accordingly, when a force in the up-down direction is applied to the first portion 11 through the steering column 62 supported by the support part 20, stress is produced in the reinforced area 11b.

However, in the aforementioned embodiment, the reinforced area 11b is covered by the plate-shaped reinforcing part 40 and thus the plate thickness is partly increased. Thus, while an increase in weight of the steering member 1 is inhibited, the stiffness of the steering member 1 against the force applied in the up-down direction through the steering column 62 can be increased.

Moreover, one end of the bracket 30, extending forward, is attached to the reinforcing part 40. Due to this, when a collision and the like of the vehicle take place, the force transmitted from one end of the bracket 30 to the steering member 1 can be distributed, and thus deformation of the steering member 1 can be inhibited.

Accordingly, while an increase in weight can be inhibited, the stiffness of the steering member 1 can be improved.

(2) The bracket attachment portion 34 is attached to the reinforcing part 40 so as to be inside the edge of the reinforcing part 40. Accordingly, when a collision and the like of the vehicle take place, the force transmitted from the bracket 30 to the steering member 1 can be more reliably distributed.

(3) In the steering member 1 according to the modified example, the reinforcing part 40 is attached to the reinforced area 11b while having the flat space 45. Accordingly, while optimizing the weight of the steering member 1, the stiffness of the steering member 1 against the force applied in the up-down direction through the steering 6 can be efficiently increased.

(4) The reinforced area 11b extends at least from the right end 19a of the steering attachment portion to the left end 19c in the right-left direction. Accordingly, the stiffness of the steering member 1 can be further improved.

(5) The bracket 30 is provided with the weak portion 33. Accordingly, when a collision and the like of the vehicle take place and thereby the bracket 30 is bent at the weak portion 33, the steering member 1 and the steering column 62 can be inhibited from projecting into the interior of the vehicle. Since one end of the bracket 30 is attached to the reinforcing part 40 and thus the stiffness of the root portion of the bracket 30 is reinforced, the bracket can be more reliably bent at the weak portion 33 when a collision and the like of the vehicle take place.

(6) The reinforced area 11b extends at least over the reinforcement range in the outer circumferential direction 14, and the support area 11a extends at least over the support range in the outer circumferential direction 14. Accordingly, the stiffness of the steering member 1 against the force in the up-down direction applied through the steering column 62 can be further improved.

Other Embodiments (1) In the above-described embodiment, the support parts 20 of the steering member 1 is attached to the steering column 62 of the steering 6, and thus the steering 6 is supported by the steering member 1. However, the support parts 20 of the steering member 1 may be attached to other parts of the steering 6 apart from the steering column 62.

(2) The main body 10 of the steering member 1 in above-described embodiment may be formed in a rod-like portion with or without a hollow. In an exemplary embodiment, the main body 10 has a hollow at least in the first portion 11, and at least the first portion 11 may be cylindrical.

(3) In above-described embodiment, the steering 6 is supported by the support parts 20 of the steering member 1. However, the steering 6 may be supported also by other parts, provided to the steering member 1, being attached to the steering 6. Specifically, the other parts may support the steering column 62 of the steering 6, or may support other parts of the steering 6, apart from the steering column 62.

(4) Several functions possessed by a single component in the above-described embodiment may be achieved by several components; a single function possessed by a single component may be achieved by several components. Several functions possessed by several components may be achieved by a single component; a single function achieved by several components may be achieved by a single component. Some parts of the configuration of the above-described embodiment may be omitted. At least one part of the component of the above-described embodiment may be added to or altered with the component of other embodiments described above.

What is claimed is:

1. A steering member installed in a vehicle to support a steering, the steering member comprising:
   a rod-like main body extending in a vehicle-width direction of the vehicle such that both ends of the main body are attached to a body of the vehicle;
   at least one support part attached to an outer circumferential surface of the main body and attached to the steering so as to support the steering;
   a plate-like reinforcing part covering and being attached to a reinforced area in the outer circumferential surface of the main body; and
   a bracket attached to the reinforcing part and extending from the reinforcing part toward a front side of the vehicle so as to be attached to the body of the vehicle,
   wherein the outer circumferential surface of the main body comprises a support area to which the at least one support part is attached,
   wherein the reinforced area faces the support area across the main body,
   wherein the reinforcing part comprises a covering area covering the reinforced area,
   wherein the covering comprising:
      an attaching area extending along an edge of the covering area; and
      a hollow area surrounded by the attaching area, and
   wherein the reinforcing part is attached to the reinforced area in a manner such that the attaching area is in contact with the reinforced area and a space is formed between the hollow area and the reinforced area.

2. The steering member according to claim 1,
wherein the reinforced area faces the support area across a center line that is a straight line extending in the vehicle-width direction, and
wherein the center line passes a center or substantially a center of a cross-section of a portion of the main body located where the reinforced area is provided, and the cross-section is perpendicular to the vehicle-width direction.

3. The steering member according to claim 1,
wherein the bracket comprises a bracket attachment portion attached to the reinforcing part, and
wherein the bracket attachment portion is attached to the reinforcing part so as to be disposed inside of an edge of the reinforcing part.

4. The steering member according to claim 1,
wherein one side of the vehicle-width direction is defined as a right side, and the other side of the vehicle-width direction is defined as a left side,
wherein the support part comprises a steering attachment portion attached to the steering,
wherein a rightmost portion of the steering attachment portion is defined as a right end, and a leftmost portion of the steering attachment portion is defined as a left end, and
wherein the reinforced area extends at least from the right end to the left end in the vehicle-width direction.

5. The steering member according to claim 1,
wherein the bracket comprises a weak portion having a stiffness lower than a stiffness in any other portion of the bracket.

6. The steering member according to claim 1,
wherein a line, passing a center or substantially a center of a cross-section of the main body perpendicular to the vehicle-width direction and extending in the vehicle-width direction, is defined as a center line,
wherein a direction of a circumference of a circle around the center line of the cross-section is defined as an outer circumferential direction,
wherein a range extending from a first position to a second position in the outer circumferential direction is defined as a reinforcement range, the second position being located at a position displaced by 90° from the first position in the outer circumferential direction,
wherein a range extending from a third position to a fourth position in the outer circumferential direction is defined as a support range, the fourth position being located at a position displaced by 90° from the third position in the outer circumferential direction,
wherein the third position is located on a straight line connecting the first position and the center line, wherein the fourth position is located on a straight line connecting the second position and the center line, wherein the reinforced area extends at least over the reinforcement range in the outer circumferential direction, and wherein the support area extends at least over the support range in the outer circumferential direction.

7. The steering member according to claim 1, wherein the reinforcing part is attached to the reinforced area so as to extend in the vehicle-width direction.

8. The steering member according to claim 1, wherein the support area is an elongated area extending in a direction intersecting with the vehicle-width direction at a right angle or approximately at a right angle.

9. The steering member according to claim 1, wherein a cross-section of the main body perpendicular to the vehicle-width direction is circular or substantially circular.

10. A steering member installed in a vehicle to support a steering, the steering member comprising:
- a rod-like main body extending in a vehicle-width direction of the vehicle such that both ends of the main body are attached to a body of the vehicle;
- at least one support part attached to an outer circumferential surface of the main body and attached to the steering so as to support the steering;
- a plate-like reinforcing part covering and being attached to a reinforced area in the outer circumferential surface of the main body; and
- a bracket attached to the reinforcing part and extending from the reinforcing part toward a front side of the vehicle so as to be attached to the body of the vehicle, wherein the outer circumferential surface of the main body comprises a support area to which the at least one support part is attached, wherein the reinforced area faces the support area across the main body, wherein a line, passing a center or substantially a center of a cross-section of the main body perpendicular to the vehicle-width direction and extending in the vehicle-width direction, is defined as a center line, wherein a direction of a circumference of a circle around the center line of the cross-section is defined as an outer circumferential direction, wherein a range extending from a first position to a second position in the outer circumferential direction is defined as a reinforcement range, the second position being located at a position displaced by 90° from the first position in the outer circumferential direction, wherein a range extending from a third position to a fourth position in the outer circumferential direction is defined as a support range, the fourth position being located at a position displaced by 90° from the third position in the outer circumferential direction, wherein the third position is located on a straight line connecting the first position and the center line, wherein the fourth position is located on a straight line connecting the second position and the center line, wherein the reinforced area extends at least over the reinforcement range in the outer circumferential direction, and wherein the support area extends at least over the support range in the outer circumferential direction.

11. The steering member according to claim 10, wherein the reinforced area faces the support area across a center line that is a straight line extending in the vehicle-width direction, and wherein the center line passes a center or substantially a center of a cross-section of a portion of the main body located where the reinforced area is provided, and the cross-section is perpendicular to the vehicle-width direction.

12. The steering member according to claim 10, wherein the bracket comprises a bracket attachment portion attached to the reinforcing part, and wherein the bracket attachment portion is attached to the reinforcing part so as to be disposed inside of an edge of the reinforcing part.

13. The steering member according to claim 10, wherein one side of the vehicle-width direction is defined as a right side, and the other side of the vehicle-width direction is defined as a left side, wherein the support part comprises a steering attachment portion attached to the steering, wherein a rightmost portion of the steering attachment portion is defined as a right end, and a leftmost portion of the steering attachment portion is defined as a left end, and wherein the reinforced area extends at least from the right end to the left end in the vehicle-width direction.

14. The steering member according to claim 10, wherein the bracket comprises a weak portion having a stiffness lower than a stiffness in any other portion of the bracket.

15. The steering member according to claim 10, wherein the reinforcing part is attached to the reinforced area so as to extend in the vehicle-width direction.

16. The steering member according to claim 10, wherein the support area is an elongated area extending in a direction intersecting with the vehicle-width direction at a right angle or approximately at a right angle.

17. The steering member according to claim 10, wherein a cross-section of the main body perpendicular to the vehicle-width direction is circular or substantially circular.

* * * * *